United States Patent [19]
Bryant et al.

[11] Patent Number: 5,501,026
[45] Date of Patent: Mar. 26, 1996

[54] CLOSABLE NET FOR UNDERWATER OPERATION AND METHOD OF USE

[76] Inventors: Vincent C. Bryant; Lauren S. Gregg, both of 3054 Oleader Dr., Lake Placid, Fla. 33852

[21] Appl. No.: 278,824

[22] Filed: Jul. 22, 1994

[51] Int. Cl.⁶ .................................................. A01K 77/00
[52] U.S. Cl. .................................................. 43/12; 43/11
[58] Field of Search ........................................ 43/11, 12, 7

[56] References Cited

U.S. PATENT DOCUMENTS

| | | | |
|---|---|---|---|
| 771,362 | 10/1904 | Ellsworth | 43/11 |
| 985,114 | 2/1911 | Covell | 43/12 |
| 2,115,082 | 4/1938 | Phillips | 43/12 |
| 2,549,475 | 2/1945 | Jardim | 43/7 |
| 2,630,646 | 3/1953 | Jensen | 43/12 |
| 2,739,403 | 3/1956 | Kalmus | 43/12 |
| 3,032,908 | 5/1962 | Cohen | 43/12 |

FOREIGN PATENT DOCUMENTS

| | | | |
|---|---|---|---|
| 0008477 | of 1903 | United Kingdom | 43/12 |
| 0961741 | 6/1964 | United Kingdom | 43/12 |
| 2026821 | 2/1980 | United Kingdom | 43/11 |

*Primary Examiner*—P. Austin Bradley
*Assistant Examiner*—James Miner

[57] ABSTRACT

The automated closing of the opening of a hand-held net. The hand-held net is operatable underwater, and specifically in saltwater. A mechanism, contained in an elongated handle, causes retraction of a predetermined section of a draw line to within the handle. The handle has pivotally attached a hoop, the hoop having attached a net. The draw line engages circumferentially the net at a location parallel to, and spaced from, the hoop. Once retraction of the draw line is activated the locations of connection of the draw line are gathered into close proximity together. This location being generally to the center of the hoop. Once retracted to this position, the net is effectively closed, preventing exit of anything contained therein through the hoop. The closed netting device is returned to an expanded position in a controlled manner by the operator by enabling a desired length of the draw line to be removed from the handle in user defined increments. This is accomplished by the incorporation of a ratchet gear in close proximity to the entry point for the draw line to the handle. The ratchet gear, having a disposed position and a engaged position, enforces a unidirectional movement of the draw line during expanding procedure. The operator would select the position of the ratchet gear during use. Opposing pulley located in the handle ensure that an adequate length of draw line is retractable, while permitting a relatively short handle to be employed.

18 Claims, 2 Drawing Sheets

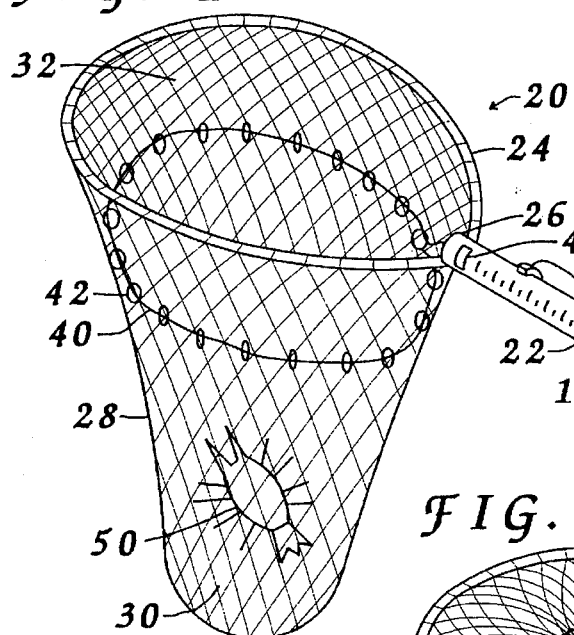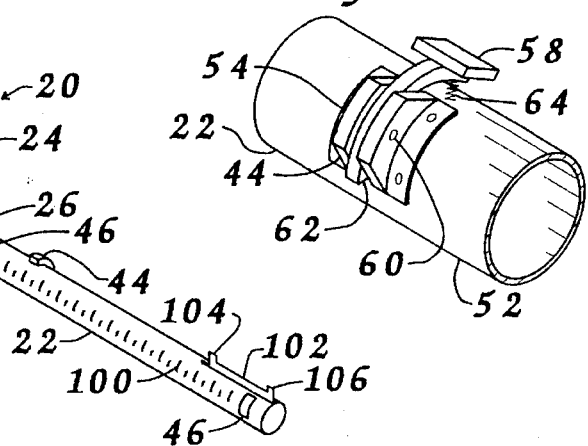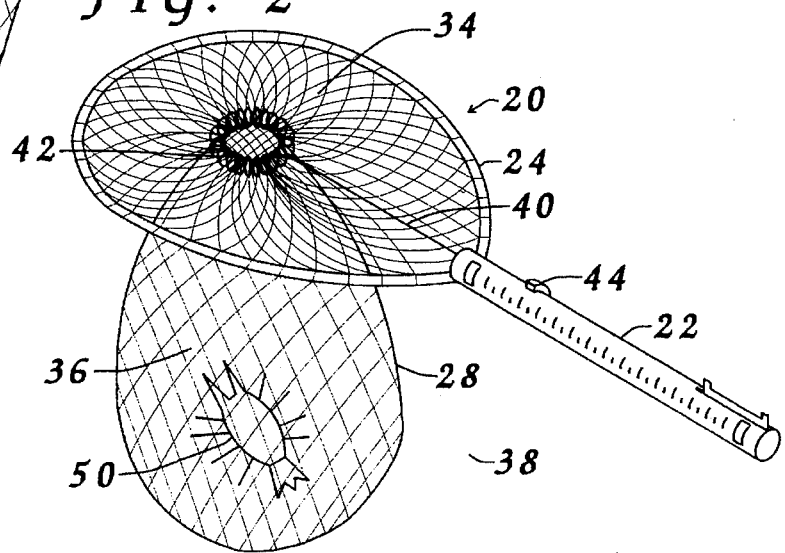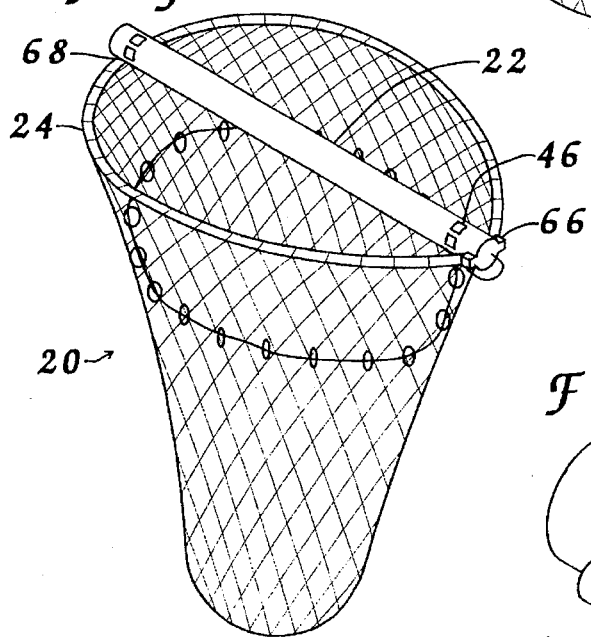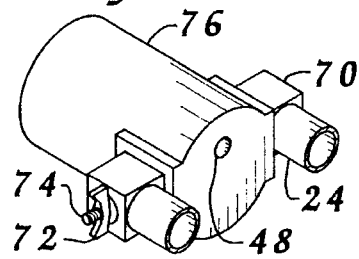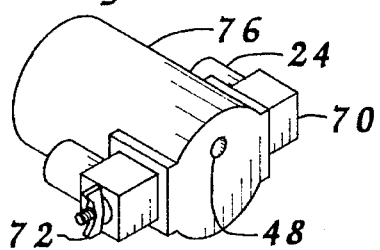

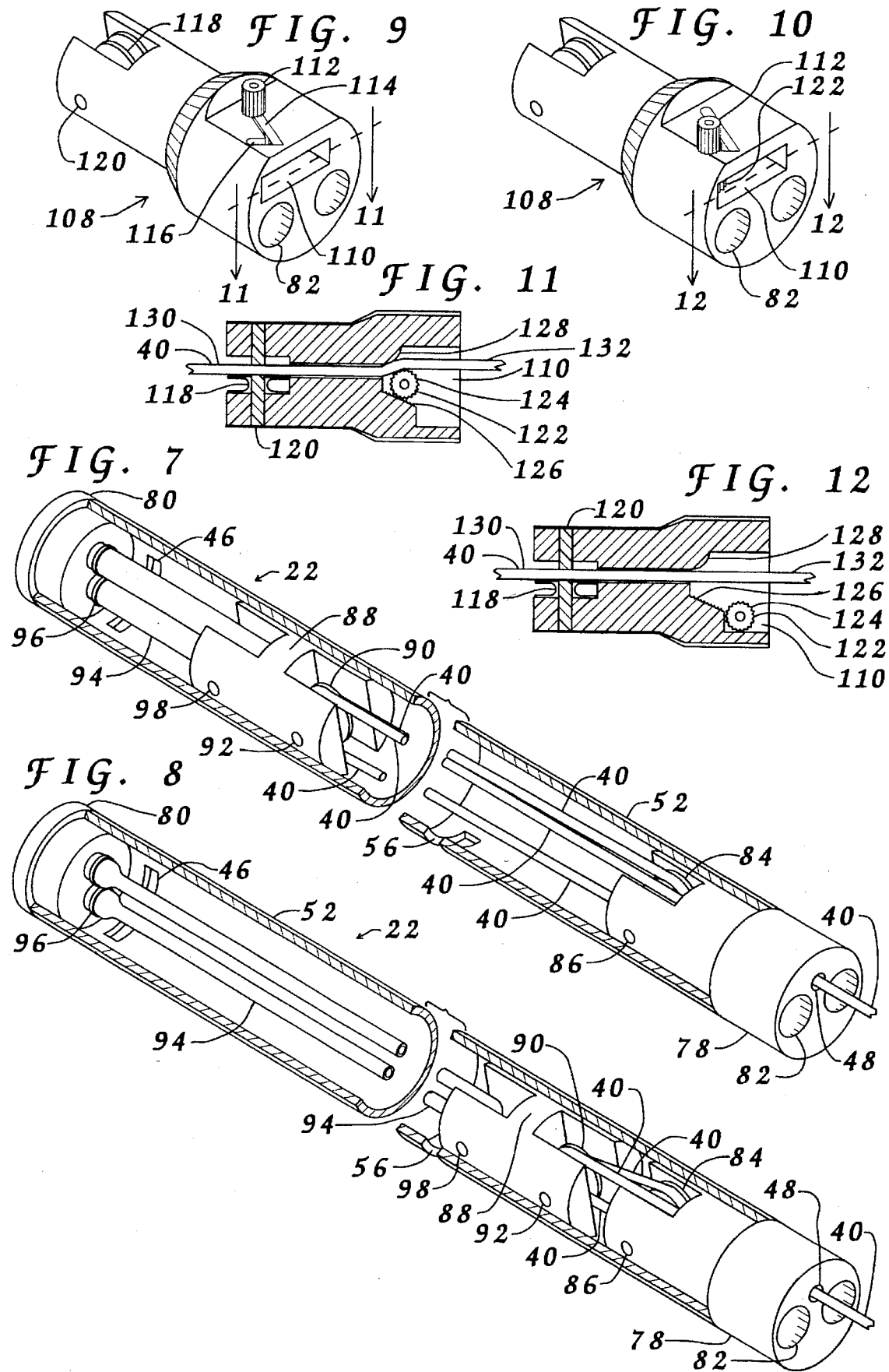

CLOSABLE NET FOR UNDERWATER OPERATION AND METHOD OF USE

BACKGROUND

Lobsters live on the bottom of the ocean near shore, and hide in holes or under rocks at depths of about 6 to 120 feet. Lobsters sit in their burrow by day and come out at night to search the ocean bottom looking for food.

Lobsters are the most popular crustacean sought by divers. Generally the diver will attempt to capture the lobster either in a hand held net or with a retractable loop of line mounted on a pole or by hand. Use of a hand held net, similar to the common landing net used by fishermen, is facilitated by holding the net with one hand while holding an elongated object in the other hand. The diver will attempt to persuade the lobster to advance from its burrow by moving the elongated object near the lobster. Once the lobster is accessible, and a distance from rocks and other obstructions, the diver will attempt to manipulate the net to place the lobster within the net. With the lobster within the net, the diver must place the opening of the net against a surface to close the opening and prevent escape of the lobster. This is usually an awkward procedure which occasionally allows escape of the lobster. The second method, being the closable hoop on a pole, is difficult to employ due to the many legs of a lobster and the rapid movement of the lobster during persuade. Additionally, both hands are required to retract the hoop to the closed position, eliminating the use of a probing device. Attempting to capture a lobster using ones hands is difficult and ill advised due to possible damage to the lobster. Both the hoop method and the hand catching method are not advised due to the lobsters ability to cast off an appendage that becomes injured or that is seized by a predator. This self-amputation is called autotomy and may result in escape of an injured lobster which then must survive with the disability. Appendages that are lost by the lobster can be regenerated and may develop to near normal size.

For the foregoing reasons there is a need for a closable netting device suitable for hand-held operation underwater. The device must allow the diver to manipulate the device with one hand, thus leaving the other hand free to employ a probing device to coax the lobster into an exposed location and then into the netting device. The device must further allow rapid closure of the nets opening using the one hand holding the netting device.

SUMMARY

The present invention is directed to a hand-held netting device, suitable for underwater operation, which may be deployed and closed using a single hand. The device is well adapted to capturing crustaceans such as lobster. The device is similar to conventional landing nets having an elongated handle with a hoop extending from the handle with a net attached to the hoop. Attached around the circumference of the net, and spaced from the hoop, is a draw apparatus such as spaced eyelets. A draw line is inserted through the draw apparatus and is attached to a retraction mechanism contained in the handle. Ideally, a set of pulleys are placed in the handle to allow a relatively short handle to be employed. These pulleys operate to gather a significantly greater length of draw line into the handle than the overall length of the handle. The retraction mechanism is activated by the operator utilizing a triggering mechanism attached to the exterior of the handle. Once activated, the retraction mechanism pulls a predetermined amount of the draw line into the handle and causes a gathering of the draw apparatus to a central location within the opening of the hoop. This gathering causes the opening of the net to close preventing escape of the object from within the confinement area. Operation of the device using a single hand allows the operator to employ a probing device, such an elongated stick, to manipulate the crustacean into a position that allows netting to occur. The netting device is versatile and adaptable for use above water for such tasks as landing fish caught with a pole and capturing small fish such as bait minnows or even tropical fish.

BRIEF DESCRIPTION OF THE DRAWINGS

These and other features, aspects, and advantages of the present invention will become apparent to those skilled in the art from the following description, appended claims, and accompanying drawings where:

FIG. 1 is a perspective view of a netting device in the open position.

FIG. 2 is a perspective view of the netting device illustrated in FIG. 1 in the closed position.

FIG. 3 is a perspective view of a netting device showing the optional angular adjustable handle in the full closed position.

FIG. 4 is a perspective view of a trigger member.

FIG. 5 is a perspective view of a front member having a hoop adjustment member.

FIG. 6 is a perspective view of the front member illustrated in FIG. 5 following adjustment of the hoop adjustment member.

FIG. 7 is a cutaway perspective view of a handle in a retracted position.

FIG. 8 is a cutaway perspective view of the handle illustrated in FIG. 7 in an extended position.

FIG. 9 is a perspective view of a ratchet cap in the engaged position.

FIG. 10 is a perspective view of the ratchet cap illustrated in FIG. 9 in the disengaged position.

FIG. 11 is a sectional top plan view of the ratchet cap as taken from the section line shown in FIG. 9. FIG. 12 is a sectional top plan view of the ratchet cap as taken from the section line shown in FIG. 10.

DESCRIPTION

Overview

Referring now to the drawings where like reference numerals refer to like parts throughout the various views. Referring specifically to FIG. 1, FIG. 2 and FIG. 3, a netting device 20 having a handle 22, a hoop 24 and a net 28 attached to hoop 24 are disclosed. Handle 22 is substantially hollow with the various retraction mechanism contained therein as disclosed below. Vents 46, located at opposing ends of handle 22, ensure adequate intake and exhaust of water during operation of the mechanism contained therein. Netting device 20 is operable underwater to transfer net 28, from open position 32, shown in FIG. 1, to closed position 34, shown in FIG. 2. Hoop 24 is attached to handle 22 at connection 26. Hoop 24 has circumferentially attached thereto net 28 with hoop 24 defining the sole opening of sufficient size to permit entry or exit of a crustacean to bunt 30, from an outside area 38, shown in FIG. 2. A lobster 50 is shown within net 28, and more particularly within a confinement area 36, shown in FIG. 2. Attached to net 28 are a plurality of eyelets 42 which circumferentially span net 28 in a spaced manner relative to hoop 24. A draw line 40, terminally attached within handle 22 as disclosed below, extends through each eyelet 42 around the circumference of net 28. Eyelets 42 form a draw apparatus to allow a gathering of net 28 to a central location within hoop 24, as shown in FIG. 2. Draw line 40, as disclosed below, is retracted rapidly into handle 22 when trigger member 44 is activated transferring netting device 20 from open position 32, shown in FIG. 1 to closed position 34, shown in FIG. 2. It being noted that operation of netting device 20, from open position 32 to closed position 34 is possible, and advisable, using a single handed operation. This leaves the operators second hand free to use a probing staff, not shown, to convince the lobster to leave its burrow, hole or other obstructions such as rocks.

Located on handle 22 are markings 100 spaced uniformly in increments being conventional units of measurement. Markings 100 allow for easy measurement of trapper crustaceans or fish. A measuring device 102, having a first extension 104 and a second extension 106, is attached to handle 22. Various measurements are possible utilizing first extension 104 and second extension 106 to determine whether the trapped lobster meets legal size limits.

FIG. 3 illustrates the utilization of a pivotal attachment 66 to place netting device 20 in a storage position. Pivotal attachment 66 permits handle 22 to be rotated relative to hoop 24 to place handle 22 in close proximity to hoop 24, for storage or transport of netting device 20. A distal point 68 is the point of contact between handle 22 and hoop 24 furthest from pivotal attachment 66.

DETAILED DESCRIPTION OF THE ELEMENTS

FIG. 4 illustrates in greater detail trigger member 44, shown in FIG. 1 and FIG. 2. A trigger housing 54 is attached to tube 52, being a cutaway section of handle 22. Pivotally mounted to trigger housing 54, utilizing a pivotal shaft 60, is a blocking member 62, which has a section extending to the interior of tube 52. A trigger 58 is provide, and held in an elevated position relative to tube 52, by a spring 64. This elevated position causes blocking member 62 to have a disposed position penetrating tube 52.

FIG. 5 and FIG. 6 illustrate a front member 76. Front member 76 would replace front cap 78 illustrated in FIG. 7 and described below. An entry point 48 is provided for entry of a draw line, more particularly disclosed below. A hoop adjustment member 70, has attached thereto hoop 24, permits radially adjustment of hoop 24 relative to front member 76 and therefore to the handle. Once in a desired position a locking member 72 would be tightened relative to bolt 74 to secure hoop 24 relative to front member 76. FIG. 5 shows hoop 24 extending in a straight line relative to front member 76. FIG. 6 shows hoop 24 fully retracted to place the hoop adjacent to the handle, as shown in FIG. 3, for storage or transport. It being understood that hoop 24 is selectively adjustable, and lockable, to a desired position throughout the 360 degree span.

FIG. 7 and FIG. 8 illustrate the internal mechanism which forms one embodiment of the retraction displacement means. FIG. 7 shows the mechanism retracted, or placing netting device 20, in closed position 34, shown in FIG. 2. FIG. 8 shows the mechanism extended, or allowing netting device 20, to be placed in open position 32, shown in FIG. 1.

It being understood that the facing section of tube 52, as well as a central section of the longitudinal length of tube 52, are shown cutaway for illustrative purpose.

Handle 22, being of a cylindrical hollow design, and having a back cap 80, a front cap 78 and a pulley member 88. Front cap 78 has incorporated therein a pair of hoop attachment holes 82 for attaching hoop 24, illustrated in FIG. 1, to handle 22. Pulley member 88 is movable within handle 22 between the retracted position, shown in FIG. 7, and the extended position, shown in FIG. 8. Pulley member 88, having an anchor shaft 98, has attached thereto a section of surgical tubing 94 which is anchored to back cap 80 utilizing tie tabs 96. Surgical tubing 94, being elastic, provides pulley 88 with a natural tendency to return to its predominant position, being in close proximity to back cap 80. Various vents 46, ensure adequate intake and exhaust of water during transition from the retracted position to the extended position and back to the retracted position. Pulley member 88 further has a pulley 90 secured by a second pulley shaft 92. Second pulley shaft 92 permits a rotatable mounting for pulley 90. Front cap 78 has a first pulley shaft 86 securing a stationary pulley 84. Stationary pulley 84 is rotatable mounted thereto. Penetrating front cap 78 is a passage leading from an entry point 48 to the interior of handle 22. A draw line 40 passes therethrough. It being understood that draw line 40 terminally engages the draw apparatus, illustrated as eyelets 42 in FIG. 1 and FIG. 2. A locking access slot 56 penetrates handle 22 a predetermined distance from back cap 80. FIG. 8 illustrates the set position having pulley member 88 positioned on the far side of locking access slot 56 relative to back cap 80. Locking access slot 56 cooperates with blocking member 62 of trigger member 44, illustrated in FIG. 4, to temporarily restrict pulley member 88 to this position. It being understood that surgical tubing 94, is applying elastic power to attempt to return pulley member 88 to its predominant position, being in close proximity to back cap 80. It being further understood that when blocking member 62 is displaced from its disposed position penetrating tube 52, as illustrated in FIG. 4, pulley member 88 will return rapidly to its predominant position, being in close proximity to back cap 80. Draw line 40 enters handle 22 through entry point 48 and engages pulley 90 located on pulley member 88. Draw line 40, following engagement with pulley 90, which causes an approximate 180 degree change in direction of draw line 40, then engages stationary pulley 84. Draw line 40, following engagement with stationary pulley 84, which causes an approximate 180 degree change in direction of draw line 40, then terminally engages second pulley shaft 92. Release of blocking member 62, shown in FIG. 4, from locking access slot 56 causes a rapid transfer of pulley member 88 from the position illustrated in FIG. 8 to the position illustrated in FIG. 7. This rapid transfer causes a predetermined, retraction length of draw line 40, engaging pulley 90 and stationary pulley 84, to be rapidly retracted to within handle 22.

FIG. 9, FIG. 10, FIG. 11 and FIG. 12 show a ratchet cap 108. FIG. 11 is taken from the section line shown in FIG. 9, FIG. 12 is taken from the section line shown in FIG. 10. Ratchet cap 108, having a stationary pulley 118 rotatory mounted on a pulley shaft 120, and a pair of hoop attachment holes 82 which allow attachment of hoop 24, illustrated in FIG. 1. It being understood that ratchet cap 108 would replace front cap 78, illustrated in FIG. 7 and FIG. 8, to provide selective unidirectional movement to draw line 40. Formed in ratchet cap 108 is an engaging track 114 and a disengaging track 116. Manipulation of a tab 112 causes movement between engaging track 114 and disengaging track 116 which causes movement of a line engagement gear 122. When in the disposed position, as shown in FIG. 10 and FIG. 12, bidirectional unrestricted movement of draw line 40 is possible. When in the engaged position, as shown in FIG. 9 and FIG. 11, unidirectional, or one way, movement of draw line 40 is possible, with that direction being from the handle outward. An entry slot 110 houses line engagement gear 122 which does not contact draw line 40 while in the disposed position, as shown in FIG. 12. When in the engaged position, as shown in FIG. 11, line engagement gear 122 contacts both draw line 40 and wall teeth 126. It being understood that draw line 40, being attached to the retraction mechanism disclosed above, has a tension pulling toward the retraction side 130.

When tab 112 is in the engaging track 114, shown in FIG. 9, tension on draw line 40 causes line engagement gear 122 to be pulled angularly to contact draw line 40 and force draw line 40 into a contact surface 128. Wall teeth 126 contact line engagement gear 122 to prevent slippage. Thus draw line 40 is restricted from moving to the retraction side. Pressure on draw line 40 from expansion side 132 causes line engagement gear to move away and permit passage of draw line 40 to the expansion side. When pressure on draw line 40 is released from expansion side 132, line engagement gear 122 returns to engage draw line 40 against contact surface 128 and prevent passage of draw line 40 to retraction side 130. This position permits transfer from closed position 34, shown in FIG. 2, to open position 32, shown in FIG. 1, in a controlled manner to have greater control over the trapped crustacean.

When tab 112 is in disengaging track 116, as shown in FIG. 10, unidirectional travel of draw line 40 is possible. It being understood that this setting would be implemented following locking of pulley member 88 in the extended position, as shown in FIG. 8. This position permits the retraction mechanism to operate unrestricted.

Due to the operation of the device underwater, and particularly in saltwater, the various components are constructed of plastic or aluminum. Preferably the handle and the majority of the components contained therein are formed of plastics, while the hoop is preferably formed of aluminum. The draw line is preferably formed of a nylon material, the net is of any material conventionally used for such construction. The eyelets are preferably of a plastic material. The surgical tubing is, of course, of a plastic material. The tie tabs securing the surgical tubing to the back cap are of the conventional draw strap design and constructed of a plastic material.

Advantages of the invention

The previously described embodiments of the present invention have many advantages, including the ability to gather and close the opening of the net from a position on the net spaced from the hoop to which it is attached. Another advantage is the ability to manipulate the netting device and activate the closing mechanism of the netting device with one hand. A further advantage is the significantly reduced danger of injuring the crustacean being captured. Yet another advantage rests in the versatility of above water use of the device for use as a landing net or as a dip net. Still another advantage is the reduced possibility of escape of the crustacean by providing for a controlled opening of the netting device following the retraction step.

Alternatives and closing

While surgical hose has been disclosed to provide the elastic power to perform the retraction displacement operation which acts upon the draw line, springs or reel type devices are envisioned. While the handle having a hoop with a net attached has been disclosed, the handle with the retraction aspect is easily adaptable to use a closable hoop for one handed operation. It is envisioned that the hoop and net could be detachably mounted to the handle and interchangeable with such a closable hoop for certain trapping operations and circumstances.

While many specific structural details have been disclosed, it will be understood that it is capable of many modifications, and this application is intended to cover any variation, uses, or adaptations of the invention, following in general the principles of the invention and including such departures from the present disclosure as to come with the knowledge of customary practice in the art, and as may be applied to the essential features hereinbefore set forth and falling within the scope of the invention or the limits of the appended claims.

We claim:

1. A netting device suitable for hand-held operation underwater for trapping a crustacean, the netting device comprising;

a) a handle, the handle substantially hollow comprising a connection end, an entry point, an interior, an exterior, the entry point in close proximity to the connection end;

b) a hoop, the hoop having a hoop circumference, the hoop circumference defining an opening, the hoop attached to the connection end of the handle, the handle and the hoop having a point of connection;

c) a flexible net, the flexible net having a net circumference, a bunt, an open position, a closed position, the flexible net attached to the hoop and encircling the hoop circumference, the bunt defining a confinement area for the crustacean, the bunt extendable to one side of the opening of the hoop, the opening of the hoop being the only opening of the flexible net of sufficient size to permit passage of the crustacean between the confinement area and an outside area, the outside area being beyond the confinement area, the open position having the confinement area of the flexible net substantially open at the opening of the hoop, the closed position having the confinement area of the flexible net substantially closed at the opening of the hoop;

d) a draw apparatus, the draw apparatus secured to the flexible net and at least partially encircling the net circumference, the draw apparatus having a spacing, the spacing being the distance from, and relatively parallel to, the hoop, the spacing from the hoop sufficient to allow for collection of the draw apparatus to a central location, the central location relatively central within the opening of the hoop, the draw apparatus having an entry point, the entry point being in close proximity to the handle;

e) a draw line, the draw line having a first end, a second end, a retraction length, the first end inserted through the draw apparatus utilizing the entry point and extending through the draw apparatus at least partially around the net circumference, the second end inserted through the entry point in the handle, the draw line adaptable for retraction and expansion of the flexible net between the open position and the closed position, the retraction length being the amount of the draw line required to transfer the flexible net from the open position to the closed position;

f) retraction displacement means, the retraction displacement means to cause retraction of the retraction length of the draw line to within the handle to cause the draw apparatus, attached to the flexible net, to be collected to the central location within the opening of the hoop to cause the flexible net to be placed in the closed position;

g) locking means, the locking means to selectively restrict activation of the retraction displacement means;

h) a trigger mechanism, the trigger mechanism located at a predetermined position on the handle, the trigger mechanism to permit controlled release of the locking means to activate the retraction displacement means;

whereby the user would position the netting device to place the crustacean within the confinement area of the flexible net and operate the trigger mechanism to release the locking means to cause the retraction displacement means to cause the draw apparatus to place the flexible net in the closed position to trap the crustacean and prevent escape thereof.

2. The netting device defined in claim 1 wherein the draw apparatus is comprised of a plurality of spaced eyelets.

3. The netting device defined in claim 1 wherein the hoop is relatively aligned with the handle.

4. The netting device defined in claim 1 further comprising pivotal attachment means and hoop securing means, the pivotal attachment means permitting angular adjustment of the hoop relative to the handle to a desired angle, the hoop securing means permitting stationary locking of the hoop to the handle at the desired angle; whereby the user may select and secure the angle of offset of the hoop to the handle.

5. The netting device defined in claim 4 wherein the pivotal attachment means permits angular displacement of the hoop relative to the handle to bring the hoop into contact with the handle at a distal point, the distal point being the point contact is made by the hoop and the handle furthest from the point of connection of the hoop and the handle; whereby ease of transport and ease of storage of the netting device is enhanced.

6. The netting device defined in claim 1 wherein the retraction displacement means comprises an elastic powered mechanism secured in the interior of the handle.

7. The netting device defined in claim 6 further comprising a pulley member and a stationary pulley, the stationary pulley mounted in the interior of the handle, the pulley member having a pulley, the pulley member mounted in the interior of the handle, the draw line entering the handle through the entry point, the draw line engaging the pulley of the pulley member then engaging the stationary pulley then terminally secured to the pulley member, the pulley of the pulley member causing a first change in direction of the draw line, the stationary pulley causing a second change in direction of the draw line, the pulley member having a first stationary position and a second stationary position, the first stationary position placing the pulley member and the stationary pulley in close proximity at one end of the handle, the second stationary position placing the pulley member and the stationary pulley at opposing ends of the handle, the first stationary position placing the draw line in an extended position, the extended position permitting placement of the flexible net in the open position, the second stationary position placing the draw line in a retracted position, the retracted position causing the flexible net to be placed in the closed position, the pulley member movable between the first stationary position and the second stationary position utilizing the elastic powered mechanism, the pulley member having a predetermined length of travel within the handle; whereby the movement of the pulley member along the length of travel results in a substantially greater length of the draw line being retracted into the handle than the length of travel of the pulley member.

8. The netting device defined in claim 1 further comprising a ratchet gear, the ratchet gear located in close proximity to the entry point of the handle, the ratchet gear capable of unidirectional passage of the draw line, the ratchet gear having an engaging position, the engaging position placing the ratchet gear in contact with the draw line allowing withdraw of the draw line from the interior of the handle while prohibiting retraction of the draw line to the interior of the handle, the ratchet gear having a disposed position, the disposed position placing the ratchet gear away from the draw line allowing bidirectional movement of the draw line, the ratchet gear having a user selective positioning means, the user selective positioning means permitting placement of the ratchet gear in either the engaging position or the disposed position; whereby the ratchet gear would be placed in the disposed position prior to activation of the retraction displacement means, and in the engaging position as a safety device against accidental triggering and to enable the controlled opening of the flexible net from the closed position to the open position.

9. The netting device of claim 1 further comprising a first extending member, a second extending member, the first extending member protruding from the exterior of the handle, the second extending member protruding from the exterior of the handle in an aligned spaced relation to the first extending member, the first extending member and the second extending member forming a measuring device, the measuring device having a predetermined spacing equal to the legal requirement of the length of an acceptable lobster; whereby the user could measure the trapped crustacean to determine whether to retain or release the crustacean.

10. The netting device of claim 1 further comprising markings, the markings placed longitudinally along the exterior of the handle, the markings equal to conventional units of measurement; whereby the user could measure a netted fish to determine whether to retain or release the fish.

11. An underwater operative hand-held crustacean netting device comprising;

a) a handle, the handle substantially hollow comprising a connection end, an entry point, an interior, an exterior, the entry point in close proximity to the connection end;

b) a hoop, the hoop having a hoop circumference, the hoop circumference defining an opening, the hoop attached to the connection end of the handle, the handle and the hoop having a point of connection;

c) a flexible net, the flexible net having a net circumference, a bunt, an open position, a closed position, the flexible net attached to the hoop and encircling the hoop circumference, the bunt defining a confinement area for the crustacean, the bunt extendable to one side of the opening of the hoop, the opening of the hoop being the only opening of the flexible net of sufficient size to permit passage of the crustacean between the confinement area and an outside area, the outside area being beyond the confinement area, the open position having the confinement area of the flexible net substantially open at the opening of the hoop, the closed position having the confinement area of the flexible net substantially closed at the opening of the hoop;

d) a plurality of spaced eyelets, the spaced eyelets secured to the flexible net and at least partially encircling the net circumference, the spaced eyelets having an offset, the offset being the distance from, and relatively parallel to, the hoop, the offset from the hoop sufficient to allow for collection of the spaced eyelets to a central location, the central location relatively central within the opening of the hoop, the spaced eyelets having an entry point, the entry point being in close proximity to the handle;

e) a draw line, the draw line having a first end, a second end, a retraction length, the first end inserted through the spaced eyelets utilizing the entry point and extending through the spaced eyelets at least partially around the net circumference, the second end inserted through the entry point in the handle, the draw line adaptable for retraction and expansion of the flexible net between the open position and the closed position, the retraction length being the amount of the draw line required to transfer the flexible net from the open position to the closed position;

f) an elastic powered mechanism, the elastic powered mechanism secured in the interior of the handle, the elastic powered mechanism to cause retraction of the retraction length of the draw line to within the handle to cause the spaced eyelets, attached to the flexible net, to be collected to the central location within the opening of the hoop to cause the flexible net to be placed in the closed position;

g) a pulley member and a stationary pulley, the stationary pulley mounted in the interior of the handle, the pulley member having a pulley, the pulley member mounted in the interior of the handle, the draw line entering the handle through the entry point, the draw line engaging the pulley of the pulley member then engaging the stationary pulley then terminally secured to the pulley member, the pulley of the pulley member causing a first change in direction of the draw line, the stationary pulley causing a second change in direction of the draw line, the pulley member having a first stationary position and a second stationary position, the first stationary position placing the pulley member and the stationary pulley in close proximity at one end of the handle, the second stationary position placing the pulley member and the stationary pulley at opposing ends of the handle, the first stationary position placing the draw line in an extended position, the extended position permitting placement of the flexible net in the open position, the second stationary position placing the draw line in a retracted position, the retracted position causing the flexible net to be placed in the closed position, the pulley member movable between the first stationary position and the second stationary position utilizing the elastic powered mechanism, the pulley member having a predetermined length of travel within the handle;

h) a ratchet gear, the ratchet gear located in close proximity to the entry point of the handle, the ratchet gear capable of unidirectional passage of the draw line, the ratchet gear having an engaging position, the engaging position placing the ratchet gear in contact with the draw line allowing withdraw of the draw line from the interior of the handle while prohibiting retraction of the draw line to the interior of the handle, the ratchet gear having a disposed position, the disposed position placing the ratchet gear away from the draw line allowing bidirectional movement of the draw line, the ratchet gear having a user selective positioning means, the user selective positioning means permitting placement of the ratchet gear in either the engaging position or the disposed position;

i) locking means, the locking means to selectively restrict activation of the elastic powered mechanism;

j) a trigger mechanism, the trigger mechanism located at a predetermined position on the handle, the trigger mechanism to permit controlled release of the locking means to activate the elastic powered mechanism;

whereby the user would position the netting device to place the crustacean within the confinement area of the flexible net and operate the trigger mechanism to release the locking means to cause the elastic powered mechanism means to cause the draw apparatus to place the flexible net in the closed position to trap the crustacean and prevent escape thereof.

12. The underwater operative hand-held crustacean netting device defined in claim 11 further comprising a first extending member, a second extending member, the first extending member protruding from the exterior of the handle, the second extending member protruding from the exterior of the handle in an aligned spaced relation to the first extending member, the first extending member and the second extending member forming a measuring device, the measuring device having a predetermined spacing equal to the legal requirement of the length of an acceptable lobster; whereby the user could measure the trapped crustacean to determine whether to retain or release the crustacean.

13. The underwater operative hand-held crustacean netting device defined in claim 11 further comprising markings, the markings placed longitudinally along the exterior of the handle, the markings equal to conventional units of measurement; whereby the user could measure a netted fish to determine whether to retain or release the fish.

14. The underwater operative hand-held crustacean netting device defined in claim 11 further comprising pivotal attachment means, hoop securing means, the pivotal attachment means permitting angular adjustment of the hoop relative to the handle to a desired angle, the hoop securing means permitting stationary locking of the hoop to the handle at the desired angle, the pivotal attachment means permits angular displacement of the hoop relative to the handle to bring the hoop into contact with the handle at a distal point, the distal point being the point contact is made by the hoop and the handle furthest from the point of connection of the hoop and the handle; whereby the user may select and secure the desired angle of the hoop to the handle during operation and fold the hoop to the handle for ease of transport and ease of storage of the underwater operative hand-held crustacean netting device.

15. The method of netting a crustacean underwater by a diver using a hand-held device, the method comprising;
  a) providing a hand-held device comprising;
    1) a handle;
    2) a hoop attached to the handle;
    3) a flexible bag attached to the hoop and having a confinement area;
    4) a draw apparatus attached to the flexible bag, the draw apparatus at least partially encircling the flexible bag in spaced relation to the hoop, the draw apparatus having an open position and a closed position, the open position having the confinement area of the flexible bag open at the hoop, the closed position having the confinement area of the flexible bag closed at the hoop;
    5) a draw line engaging the draw apparatus;
    6) a retraction mechanism contained within the handle and engaging the draw line, the retraction mechanism having an extended position and a retracted position, the extended position allowing the draw apparatus to be placed in the open position, the retracted position causing the draw apparatus to be placed in the closed position;
    7) a locking mechanism to restrict the retraction mechanism to remain in the extended position;

8) a trigger mechanism to selectively activate the retraction mechanism to transfer from the extended position to the retracted position;

b) adjusting the hand-held device to place in a state of readiness the retraction mechanism;

c) deploying the hand-held device to place the crustacean within the confinement area;

d) activating the trigger mechanism to cause closure of the flexible bag;

whereby the crustacean would be trapped within the confinement area for removal by the operator.

16. The method defined in claim 15 wherein the hand-held device further comprises a pulley member and a stationary pulley, the stationary pulley mounted in the interior of the handle, the pulley member having a pulley, the pulley member mounted in the interior of the handle, the draw line entering the handle through a entry point, the draw line engaging the pulley of the pulley member then engaging the stationary pulley then terminally secured to the pulley member, the pulley of the pulley member causing a first change in direction of the draw line, the stationary pulley causing a second change in direction of the draw line, the pulley member having a first stationary position and a second stationary position, the first stationary position placing the pulley member and the stationary pulley in close proximity at one end of the handle, the second stationary position placing the pulley member and the stationary pulley at opposing ends of the handle, the first stationary position placing the draw line in the extended position, the second stationary position placing the draw line in the retracted position, the pulley member movable between the first stationary position and the second stationary position utilizing the retraction mechanism, the pulley member having a predetermined length of travel within the handle.

17. The method defined in claim 15 wherein the hand-held device further comprises an entry point and a ratchet gear, the entry point penetrating the handle near the hoop, the ratchet gear located in close proximity to the entry point, the ratchet gear capable of unidirectional passage of the draw line, the ratchet gear having an engaging position, the engaging position placing the ratchet gear in contact with the draw line allowing withdraw of the draw line from the interior of the handle while prohibiting retraction of the draw line to the interior of the handle, the ratchet gear having a disposed position, the disposed position placing the ratchet gear away from the draw line allowing bidirectional movement of the draw line, the ratchet gear having a user selective positioning means, the user selective positioning means permitting placement of the ratchet gear in either the engaging position or the disposed position.

18. The method defined in claim 15 wherein the hand-held device further comprises pivotal attachment means and hoop securing means, the pivotal attachment means permitting angular adjustment of the hoop relative to the handle to a desired angle, the hoop securing means permitting stationary locking of the hoop to the handle at the desired angle, the pivotal attachment means permits angular displacement of the hoop relative to the handle to bring the hoop into contact with the handle at a distal point, the distal point being the point contact is made by the hoop and the handle furthest from a point of connection, the point of connection being the location of attachment of the hoop and the handle.

\* \* \* \* \*